US006833790B2

(12) United States Patent
Mejia et al.

(10) Patent No.: US 6,833,790 B2
(45) Date of Patent: Dec. 21, 2004

(54) LIVESTOCK CHUTE SCANNER

(75) Inventors: Ezequiel Mejia, Woodbury, MN (US);
Yuri Smirnov, Eagan, MN (US)

(73) Assignee: Digital Angel Corporation, South St. Paul, MN (US)

( * ) Notice: Subject to any disclaimer, the term of this patent is extended or adjusted under 35 U.S.C. 154(b) by 258 days.

(21) Appl. No.: 10/122,103

(22) Filed: Apr. 12, 2002

(65) Prior Publication Data

US 2003/0229647 A1 Dec. 11, 2003

(51) Int. Cl.[7] .............................................. G08B 23/00
(52) U.S. Cl. ........................ 340/572.7; 340/573.1; 340/572.1; 119/51.02; 119/712
(58) Field of Search ................... 340/573.3, 573.1, 340/572.1, 572.4, 572.7; 119/14.46, 51.02, 712, 720

(56) References Cited

U.S. PATENT DOCUMENTS

| | | | |
|---|---|---|---|
| 3,109,143 A | 10/1963 | Gluth et al. ................. 325/320 |
| 3,510,779 A | 5/1970 | Klapper ....................... 325/320 |
| 3,689,885 A | 9/1972 | Kaplan et al. ............ 340/152 T |
| 4,065,753 A | 12/1977 | Paul, Jr. .................. 340/152 T |
| 4,262,632 A | 4/1981 | Hanton et al. ................. 119/1 |
| 4,287,596 A | 9/1981 | Chari ........................... 375/49 |
| 4,313,033 A | 1/1982 | Walker et al. ............... 179/1 H |
| 4,368,439 A | 1/1983 | Shibuya et al. ............. 332/9 R |
| 4,388,730 A | 6/1983 | Nash et al. .................. 455/208 |
| 4,510,495 A | 4/1985 | Sigrimis et al. ....... 340/825.54 |
| 4,617,876 A | 10/1986 | Hayes ......................... 119/155 |
| 4,730,188 A | 3/1988 | Milheiser ..................... 340/825 |
| 5,041,826 A | 8/1991 | Milheiser ............... 340/825.54 |
| 5,211,129 A | 5/1993 | Taylor et al. ................... 119/3 |
| 5,673,647 A | 10/1997 | Pratt ........................ 119/51.02 |
| 5,686,902 A | 11/1997 | Reis et al. ............. 340/825.54 |
| 5,711,246 A * | 1/1998 | Yano et al. ............... 119/51.02 |
| 5,816,191 A * | 10/1998 | Beaudoin et al. ......... 119/57.92 |
| 5,901,660 A * | 5/1999 | Stein ........................ 119/51.02 |
| 5,923,300 A | 7/1999 | Mejia .......................... 343/788 |
| 5,952,935 A | 9/1999 | Mejia et al. ........... 340/825.54 |
| 6,184,777 B1 | 2/2001 | Mejia ........................... 340/10.1 |
| 6,411,213 B1 * | 6/2002 | Vega et al. ............... 340/573.3 |
| 6,427,627 B1 * | 8/2002 | Huisma ................... 119/51.02 |
| 6,497,197 B1 * | 12/2002 | Huisma ....................... 119/75 |
| 6,563,474 B2 * | 5/2003 | Nantz et al. ................ 343/788 |

* cited by examiner

Primary Examiner—Toan N. Pham
(74) Attorney, Agent, or Firm—Sheridan Ross P.C.

(57) ABSTRACT

A method and apparatus are provided to identify objects, including livestock. In one embodiment, a device is presented that includes a reflector shield mounted proximate the interrogator that is mounted on or near a livestock chute gate. The reflector shield decreases the amount of the inductive field absorbed by the livestock chute gate, thereby allowing transponders attached to livestock to be read. In a separate embodiment, multiple windings are used to form an interrogator with greater excitation and receiver capability due to the orientation of the wire windings. The multiple-winding interrogators may be used with or without the reflector shield. In yet a separate embodiment, a method is presented to utilize the device of the present invention to identify livestock moving through a livestock chute.

82 Claims, 12 Drawing Sheets

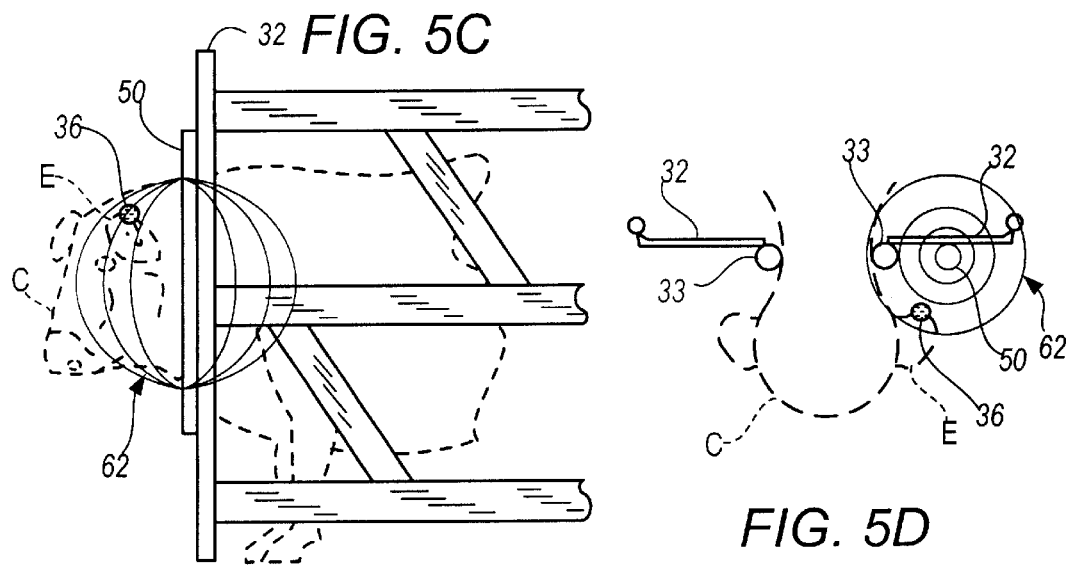
FIG. 5C
FIG. 5D
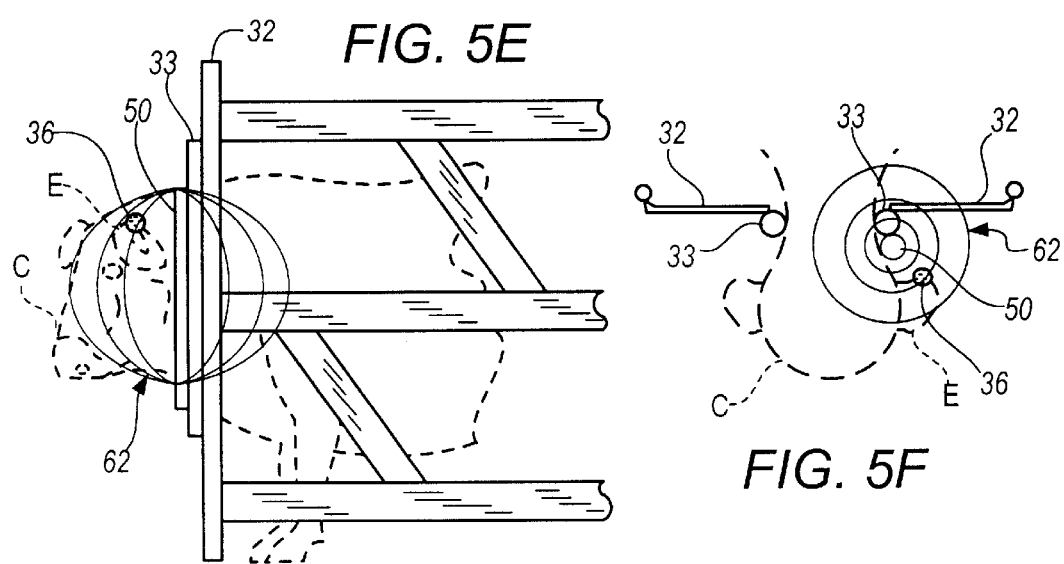
FIG. 5E
FIG. 5F

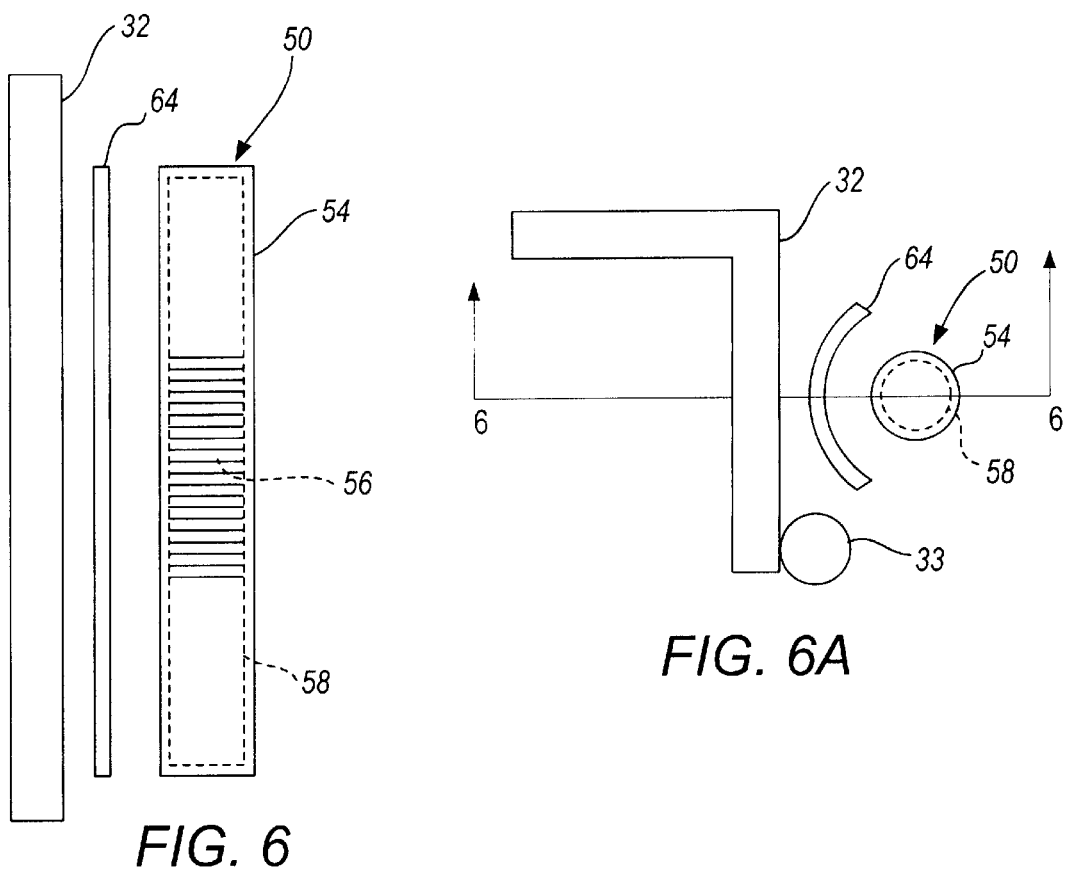
FIG. 6
FIG. 6A
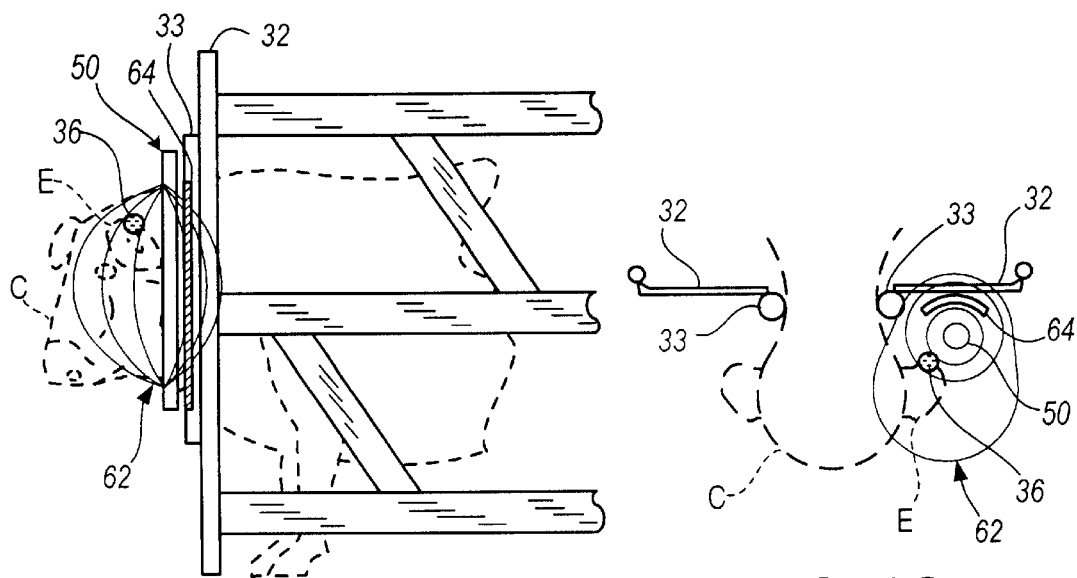
FIG. 6B
FIG. 6C

LIVESTOCK CHUTE SCANNER

This application is directed to a scanner or an interrogator for use in identification of objects, and more particularly, the identification of livestock temporarily detained by a livestock chute gate.

BACKGROUND OF THE INVENTION

Difficulties have existed for some time with electronically reading identification tags mounted on livestock. First, the transponder to be monitored is typically passive, requiring more sensitive or powerful receiving capabilities by the interrogator than is needed with a battery powered transponder in order to detect and accurately receive an identification signal from the transponder. Second, regardless of whether the transponder is implanted or externally attached to the animal, the final position or orientation of the transponder cannot be controlled. However, for optimal performance, the transponder needs a magnetic field to be emitted along the length of the transponder antenna's axis. Therefore, to optimize reading of a transponder, the axis of the transponder antenna must be aligned with the axis of the interrogator antenna. This is not always possible when dealing with live animals whose movement can cause the orientation of the transponder to change.

This problem has been addressed by assigning a worker to identify livestock. The worker given such a task, and given a hand-held reader or scanner, can adapt the position of the reader to effectuate a reading of the transponder attached to the animal regardless of the transponder's position. For example, if a hand-held interrogator is used to read a transponder affixed to an animal's ear, the worker is able to manipulate the reader by moving it and positioning it closer to, and at different angles relative to the animal's ear in an effort to obtain a reading from the transponder. The same technique works for an implanted transponder. However, the cost in terms of wages and worker safety associated with dedicating a worker to the identification effort, due to necessarily working in close proximity to large animals, has provided motivation to attempt to automate the process. As a result, various types of automated identification devices have been developed.

U.S. Pat. No. 4,617,876 discloses an automatic scanner used to identify cattle while they are being fed and/or watered. However, it does not disclose a device for scanning livestock while the animal is located in a livestock chute, nor does it disclose a device that may be mounted on a livestock chute gate/door.

U.S. Pat. No. 6,000,361 discloses a method for optimizing cattle production in large feed lots using automated measuring, feeding, and calculation methods to determine cattle management requirements. However, it too fails to disclose a device for scanning an animal in a livestock chute, and it also fails to disclose a device that can be mounted on the gate or door of a livestock chute.

Finally, U.S. Pat. No. 5,686,902 discloses a generic system of tracking a number of identification tags; nonetheless, it fails to disclose a device that can be used to identify livestock within a chute.

Common problems associated with reading a transponder that is affixed to livestock include the fact that, many times, the animal is large and ponderous, with the ability to cause significant damage to a human in close proximity to the animal should reading the transponder using a hand-held reader be attempted. A further safety hazard exists if attempts are made to retrofit an existing livestock gate with a device that projects from the gate, thereby presenting an obstacle to workers when in a fixed position, or when the swing gate is activated and is in motion.

Another common problem is that livestock may be wet or covered with dirt and mud, or the chute may be near electrical motors or subject to adverse environmental conditions, such as rain or snow. Indeed, dirt, mud, manure and moisture on the equipment and/or on the animal can adversely affect the functioning of the electronics. Still yet another common difficulty is that it is necessary to construct livestock chutes to both guide and restrain large animals. Accordingly, this requires that the livestock chute be constructed of relatively strong, durable materials that can absorb the punishment of repetitive use and exposure to the impact of a multiple large animals repeatedly coming into contact with the chute structures. Such materials often incorporate ferromagnetic components, such as steel or other metals, that interfere with the radio frequency inductive coupling between the interrogator and the transponder. Therefore, any attempt to retrofit an existing livestock chute, or mount an interrogator to a new chute, must consider and sufficiently overcome interference presented by these ferromagnetic materials.

Ideally, a high inductance of approximately 700 microhenries is sought for an interrogator because a high inductance provides a better passive transponder read range. However, interrogators operating over about 400 microhenries have been found to be unstable in the setting of a livestock chute for multiple reasons. For example, and as mentioned above, detuning is a pervasive problem that is attributable to factors such as the mass of the animal near the antenna, mud, moisture or manure on the antenna and/or animal, moisture in the area of the antenna and movement of the antenna. These and other factors can detune the antenna, causing it to fail to read the animal's transponder.

Another problem necessarily requiring attention is that positioning of an interrogator near an animal's head results in the interrogator potentially being situated such that it is vulnerable to static loading from an animal resting its weight against the interrogator housing, and/or dynamic shock from the subject animal impacting the interrogator housing. Accordingly, these problems require that the interrogator be protectively positioned or otherwise located within a structural housing capable of maintaining its structural integrity in the face of such static and dynamic loading potentially caused by livestock.

It would therefore be greatly advantageous to address the above described problems and be able to remove a worker from the task of identifying livestock as the livestock travel through a passageway or chute, and yet still obtain accurate readings as to the identification of the animals moving through the chute. The present invention provides such a solution for both new and existing livestock chute structures.

SUMMARY OF THE INVENTION

It is an object of the present invention to provide an interrogator that can be mounted proximate the livestock chute and yet accurately read a transponder that is affixed to an animal within the chute. Accordingly, it is an aspect of the present invention to provide an improved interrogator antenna.

It is a further aspect of the present invention to provide an interrogator that operates at an inductance range to maintain a relatively stable flux field.

It is a further aspect of the present invention to provide an interrogator that can be directly affixed to the livestock chute gate.

Still another aspect of the present invention is to provide an interrogator that is less sensitive to the orientation of the transponder affixed to the subject animal whose identification is sought, and one that can accurately and reliably read a transponder regardless of its relative orientation.

Furthermore, it is yet another aspect of the present invention to provide a device that may be retrofitted to existing livestock chute structures and gates without affecting worker safety and while overcoming interference, tuning and ruggedness problems.

It is yet another aspect of the present invention to provide an interrogator whose structural housing serves as an integral component of the livestock chute or gate.

The above and other aspects of the invention are realized in specific illustrated embodiments of the invention. In general, the interrogator devices disclosed herein are preferably used in conjunction with a plurality of identification transponders. Each of the plurality of transponders is adapted to attach to an article to be identified. In use, an interrogator produces an interrogation signal for interrogating at least one of the plurality of transponders. In response to the interrogation signal, the transponders transmit an identification signal having an identification component, thus identifying the particular item to which the transponder is attached.

In a first embodiment, an interrogator device is provided that includes a transmitter having a first transmit coil wound in a first direction, a second transmit coil wound in a second direction different than the first direction, and a third transmit coil wound in a third direction different than the first or second directions. The first transmit coil, the second transmit coil and the third transmit coil are coupled to one another.

In a separate embodiment, an interrogator device is provided that includes a transmitter having a first transmit coil encompassed by a second transmit coil. The first transmit coil and the second transmit coil are electrically coupled to one another. The first transmit coil generates a first flux field, the second transmit coil generates a second flux field. The first flux field circumscribes the second flux field.

In a yet separate embodiment, an interrogator device is provided that includes an inner core having a longitudinal axis and a transmitter. The transmitter includes a first transmit coil wound around the longitudinal axis, a second transmit coil wound around the longitudinal axis, and a third transmit coil wound substantially parallel to the longitudinal axis. The first transmit coil, the second transmit coil and the third transmit coil coupled to one another.

In still yet a separate embodiment, an interrogator device is provided that includes a transmitter having a transmit coil, and a reflector shield situated proximate the interrogator device.

In yet a separate embodiment, an interrogator device and a mechanical gate combination are disclosed. The interrogator device includes a transmitter having a first transmit coil wound in a first direction, a second transmit coil wound in a second direction different than the first direction, and a third transmit coil wound in a third direction different than the first or the second directions. The first transmit coil, the second transmit coil and the third transmit coil are electrically coupled to one another. As noted, the combination includes an a mechanical gate, such as a cattle chute gate fitted with the interrogator device.

In yet a separate embodiment, a system for identifying characteristics of animals in a livestock chute is disclosed. The system includes a transponder mounted to an animal to be identified, an interrogator, and a reflector shield. The interrogator has an antenna assembly for transmitting an interrogation signal to the transponder, and for receiving an identification signal from the transponder. The reflector shield is situated proximate the interrogator, and projects a portion of the interrogation signal toward the transponder.

Finally, in yet a separate embodiment, a method of identifying an animal is disclosed. The method includes the steps of providing a livestock chute that can temporarily confine an animal, attaching a transponder to the animal, and attaching an interrogator proximate the livestock chute gate. The interrogator used in this method has a transmitter including a first transmit coil wound in a first direction, a second transmit coil wound in a second direction different than the first direction, and a third transmit coil wound in a third direction different than the first or the second directions. In addition, the first transmit coil, the second transmit coil and the third transmit coil are electrically coupled to one another. The interrogator also has a receiver. The method further includes the steps of providing a power source to the interrogator, transferring an animal to the livestock chute gate, generating an interrogation signal by activating the transmitter, receiving an identification signal from the transponder, processing the identification signal, and creating an output signal substantially corresponding to the identification component of the identification signal.

Still other aspects and advantages of the invention will in part be obvious and will in part be apparent from the specifications and drawings.

BRIEF DESCRIPTION OF THE DRAWINGS

Several drawings have been developed to assist with understanding the invention. Following is a brief description of the drawings that illustrate the invention and its various embodiments.

FIG. 1b is a cross-sectional view of the wire winding of FIG. 1a.

FIG. 2b is a top view of the flux pattern depicted in FIG. 2a.

FIG. 3b is a top view of the flux pattern depicted in FIG. 3a.

FIG. 5c is the side view of the flux pattern of the interrogator of FIG. 5 when mounted on a livestock chute gate with an animal present.

FIG. 5d is a top view of the flux pattern depicted in FIG. 5c.

FIG. 5e is the side view of the flux pattern of the interrogator of FIG. 5 when interconnected to a roll-bar of a livestock chute gate, and with an animal present.

FIG. 5f is a top view of the flux pattern depicted in FIG. 5e.

FIG. 6 is across-sectional view of a single cylindrical-shaped antenna located adjacent an arcuate-shaped reflector shield, both positioned proximate a livestock chute gate.

FIG. 6a is a top view of the structures depicted in FIG. 6.

FIG. 6b is the side view of the flux pattern of the interrogator of FIG. 6 when mounted on a livestock chute gate with an animal present.

FIG. 6c is a top view of the flux pattern depicted in FIG. 6b.

While the following disclosure describes the invention in connection with those embodiments presented, one should understand that the invention is not strictly limited to these embodiments. Furthermore, one should understand that the drawings are not necessarily to scale, and that in certain instances, the disclosure may not include details which are not necessary for an understanding of the present invention, such as conventional details of fabrication and assembly.

DETAILED DESCRIPTION

The present invention concerns various embodiments of interrogators used to read transponders under previously difficult conditions. More particularly, the present invention focuses on utilizing interrogators to read ear tags that are attached to livestock. Previously issued patents have disclosed the technology concerning how identification of items is performed using passive transponders. These patents include U.S. Pat. Nos. 4,730,188; 5,041,826 and 5,211,129, all of which are incorporated herein by reference in their entirety. As used herein, the terms exciter, interrogator, scanner, and reader are synonymous. In general, a system consists of an exciter/reader and a transponder located in or otherwise attached to an object to be identified. The transponder comprises a coil which receives an interrogation signal and transmits an identification signal in response thereto. One or more coils may perform these functions. The transponder further contains an identification code uniquely identifying the item or animal to which it is implanted or attached. When in use, the transponder receives the energy required for transmission by inductive coupling to the interrogator. The transponder detects the interrogation signal, rectifies the interrogation signal to generate power needed for its own subsequent transmission, and generates an identification signal in response to the interrogation signal. The interrogator then reads the signal emitted by the transponder by means of radio frequency inductive coupling and processes the signal to properly identify the item corresponding to the transponder.

Figure 1:
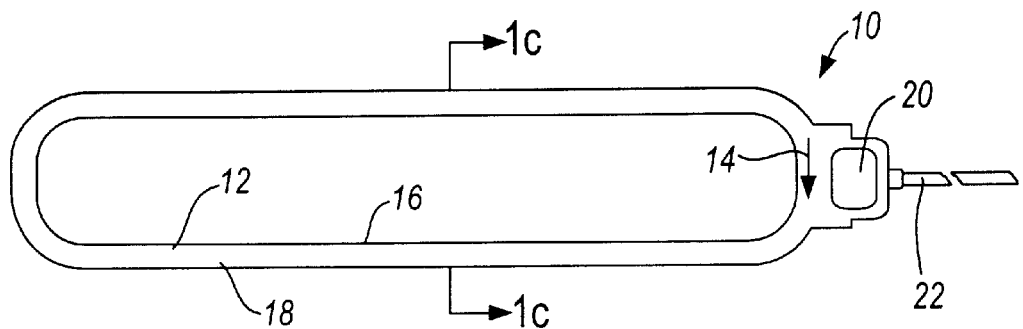
FIG. 1 is a front view of an interrogator having a rectangular-shaped antenna.
Figure 1A:
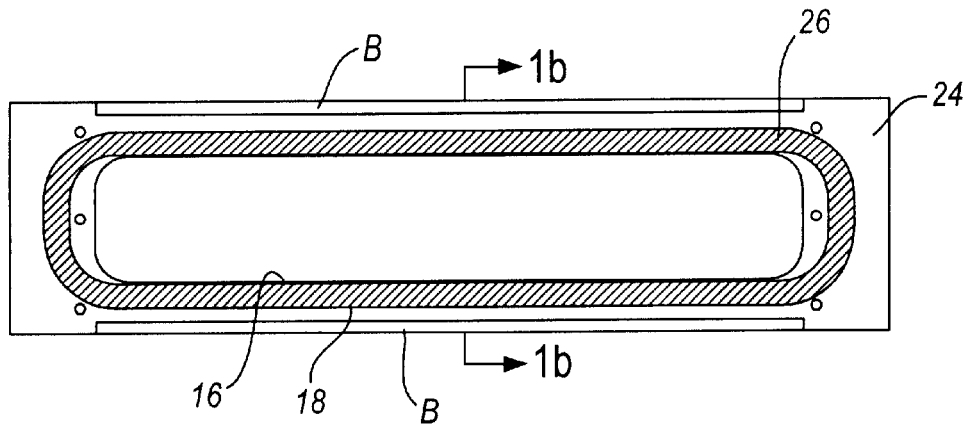
FIG. 1a is a front view of the interrogator of FIG. 1 depicting the wire winding.
Figure 1B:
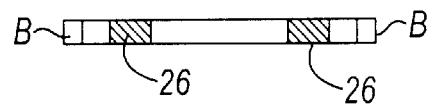

In a first embodiment depicted in FIG. 1, a rectangular-shaped interrogator 10 is illustrated. The rectangular-shaped interrogator 10 is typically positioned proximate a livestock chute gate (not shown). The rectangular-shaped interrogator 10 includes a transmitter coil or antenna 12, that comprises a winding of wire, generally rectangular in shape, as shown in FIG. 1a and 1b. The interrogator 10 has been effectively utilized where dimensions of the coil antenna are 30.25 inches in length by 6 inches in width. In a preferred embodiment, antenna 12 is formed using 16 turns of 18 gauge copper wire with 19 strands, and is operated to generate about 260 micro-henries inductance. As illustrated in FIG. 1, the winding direction is shown by an arrow 14. The antenna 12 has an inside edge 16 and an outside edge 18. Also depicted in FIG. 1 is a junction box 20 that leads to electrical connector 22 that communicates with an antenna interface box (not shown). The junction box allows the antenna to interface with the other interrogator components, including a computer. As shown in FIGS. 1a and b, the interrogator 10 also may be positioned on a base member 24, in which case the antenna 12 may be disposed in a recess or channel 26. The antenna also may be potted or secured within the channel by an epoxy filler or other suitable potting material. A bumper B also may be added to the base 24 to provide shock absorbing capabilities to the interrogator once installed in the field.

Figure 1C:
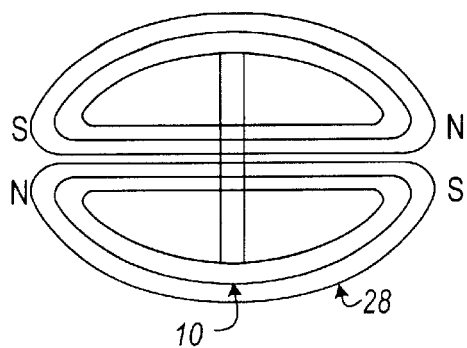
FIG. 1c is a flux pattern generated by the interrogator of FIG. 1, uninfluenced by the presence of either a livestock chute gate or an animal.
Figure 1D:
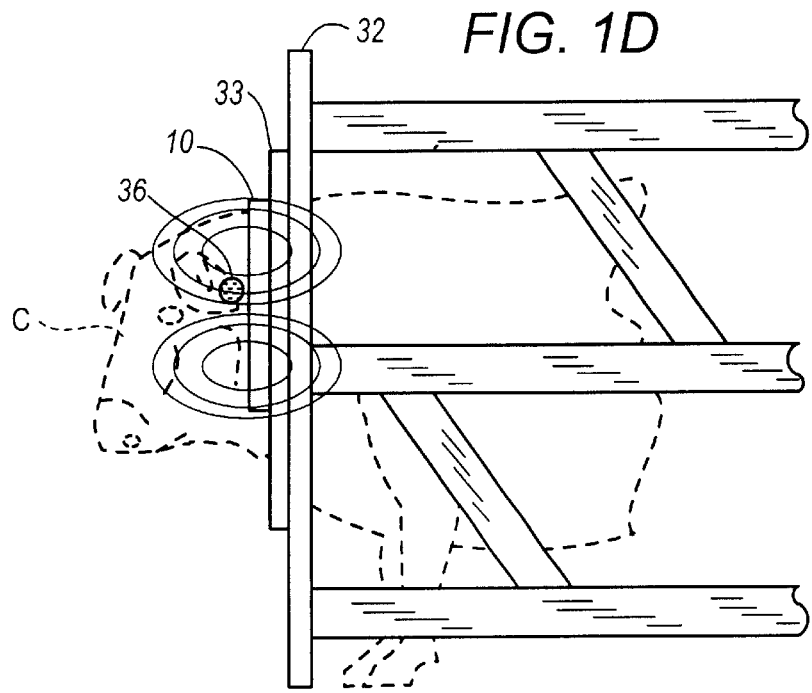
FIG. 1d is a side view of the flux pattern of the interrogator of FIG. 1 when mounted on a livestock chute gate with an animal present.
Figure 1E:
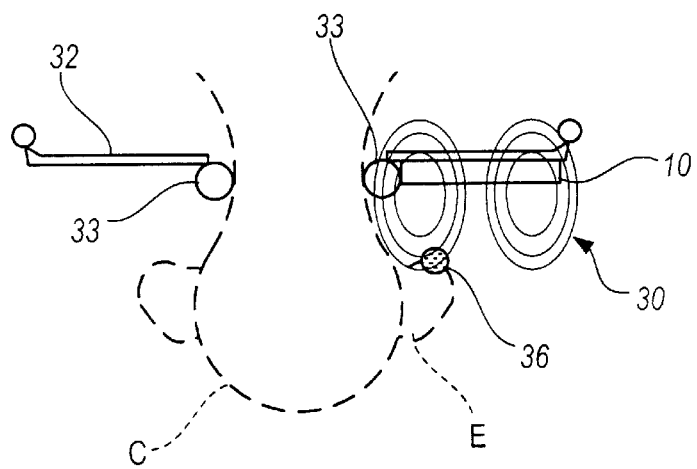
FIG. 1e is a top view of the flux pattern depicted in FIG. 1d.

FIG. 1c depicts the uninfluenced flux pattern 28 of the antenna of FIG. 1. Specifically, FIG. 1c depicts the flux pattern that is generated when not influenced by the presence of a chute gate or an animal. In comparison, FIG. 1d depicts a side view and FIG. 1e depicts a top view of the influenced flux pattern 30 of the same rectangular-shaped interrogator 10 situated near a metal livestock chute gate 32 with cow "C" present. Note that flux fields and patterns, while three dimensional, are typically depicted in two dimensions in the drawings for purposes of clarity. The metal livestock chute gate 32 with roll bar 33 significantly alters the flux pattern 28 of the antenna 12 by absorbing a portion of the flux field or interrogation signal, thereby resulting in influenced flux pattern 30. The metal livestock chute gate 32 can absorb and dissipate over one-half of the energy/flux created by the antenna 12. As a result, the system requires greater power to meet the minimum read ranges that are desired given the geometry of a typical metal livestock chute gate 32. In addition to the cost of providing additional power, the additional power also detrimentally heats up surrounding metal, such as the metal livestock chute gate 32, as well as the antenna 12 itself. While the above described embodiment has been found to function acceptably at relatively high power settings, additional embodiments are hereafter presented to improve the invention. Furthermore, additional embodiments are presented to address circumstances where transponder read conditions are less than optimum.

Figure 2:
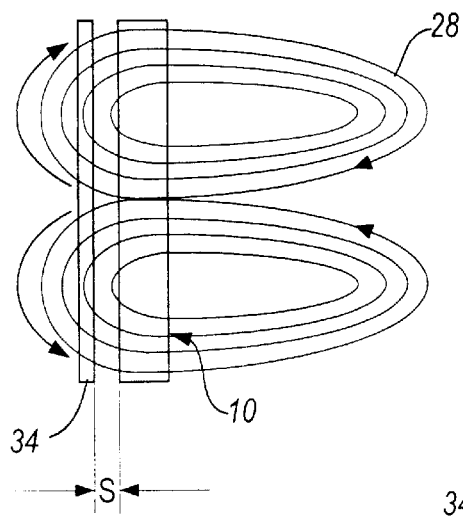
FIG. 2 is a side view of an interrogator having a single rectangular-shaped antenna and aluminum shield, uninfluenced by the presence of either a livestock chute gate or an animal.
Figure 2A:
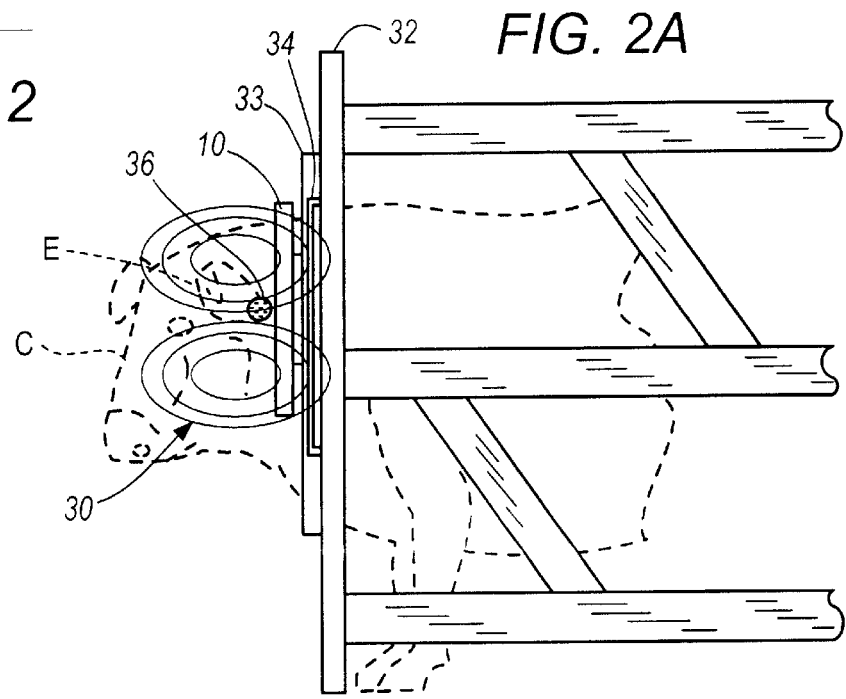
FIG. 2a is a side view of the flux pattern of the interrogator depicted in FIG. 2 when mounted on a livestock chute gate with an animal present.
Figure 2B:
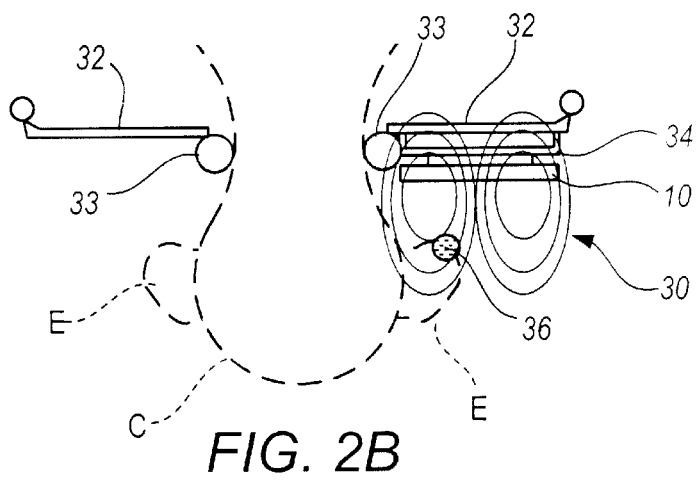

Accordingly, in another embodiment of the invention shown in FIGS. 2, 2a and 2b, installation of the interrogator 10 includes placement of a reflector shield 34 positioned proximate the interrogator 10 to direct the interrogation signal 28 toward a transponder 36 attached to ear "E" of livestock, such as cow "C." FIG. 2 depicts the flux pattern that is generated when not influenced by the presence of a chute gate or an animal. As is illustrated, the shield 34 functions to reflect a portion of the energy or magnetic field forward, thereby increasing read range for a constant input power. When installed for use, the reflector shield 34 is positioned between the antenna 12 and the chute gate 32, and reflects a portion of energy forward toward the animal's head, as well as the transponder 36. This reduces the amount of energy that is being absorbed by the metal of the chute gate 32 and roll bar 33. FIG. 2a depicts a side view and FIG. 2b depicts a top view of the energy or flux pattern 30 of rectangular-shaped interrogator 10 with a reflector shield 34 situated near a metal livestock chute gate 32 with cow "C" present. The reflector shield 34 serves to partially shield or isolate the antenna 12 from the surrounding environment, including the metal of the chute and chute gate 32. As a result, the addition of a reflector shield 34 enables the interrogator 10 to operate at lower power levels while maintaining an acceptable read range because part of the signal is reflected back toward the target transponder 36. Stated differently, without the shield 34, the antenna 12 must be driven harder to achieve an acceptable read range. The reflector shield 34 minimizes the load factor of the chute metal, thereby saving power, because the magnetic field is reflected and not shorted to the metal chute. As should be understood, this geometry can also be used to increase the read range of the interrogator 10.

Preferably, the reflector shield 34 comprises aluminum. The appropriate dimensions of a reflector shield 34 depend upon the amount of nearby metal that is sought to be shielded, as well as the distances involved in the particular installation. In a preferred embodiment, the reflector shield 34 is comprised of a 0.125 inch thick aluminum plate, with length and side dimensions at least approximately equivalent to the dimensions of the rectangular-shaped antenna. The combination of the interrogator 10 and the reflector shield 34 produce an interrogation signal that permits the interrogator 10 to read transponders 36 attached to livestock as the livestock are temporarily detained in a chute gate 32. As depicted in FIG. 2, the separation "s" between the aluminum plate serving as a reflector shield 34 and the interrogator 10 is preferably about 2 inches.

Figure 8:
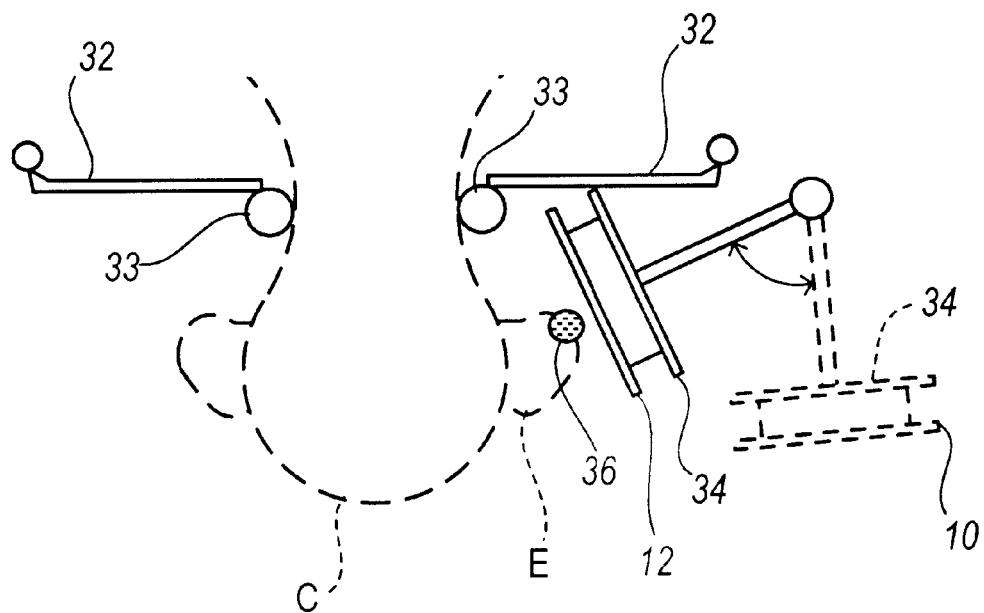
FIG. 8 is a top view of a rectangular-shaped interrogator with a reflector shield, both mounted on a moveable structure separate from the chute or chute gate.

The interrogator 10 with antenna 12, or interrogator 10 and reflector shield 34 combination are preferably mounted directly to the livestock chute gate 32 using mounting hardware (not shown). Alternately, they may be mounted to a nearby structure. For example, as shown in FIG. 8, the interrogator 10 and reflector shield 34 can be mounted to a fixed or moveable structure that is separate from the livestock chute gate 32, but is nonetheless positioned to create a flux field optimized for reading a transponder 36 when livestock are temporarily detained by the livestock chute gate 32. Accordingly, depending upon the geometry of the installation site, adjacent structures, if available, may serve as suitable mounting locations for interrogator 10 and optionally, the reflector shield 34.

FIGS. 2a and 2b depict the flux field generated by the interrogator 10 and reflector shield 34 arrangement of FIG. 2 in the presence of livestock. As can be seen from FIGS. 2a and 2b, a greater portion of the flux field is projected forward, away from the chute and chute gate 32, but filling the zone where the head of the animal will be positioned. The ability of the reflector shield to project the interrogation field forward improves the distance with which a transponder 36 can be read.

In yet a farther embodiment, as depicted in FIGS. 3, 3a–c, multiple antennas or coils are used within one interrogator 10' to form one transmitter and provide increased coverage by the flux pattern of the target transponder read area. The use of multiple coils within one interrogator 10' decreases the chance of not reading a target transponder that is oriented in a non-optimal way relative to the flux pattern, such as perpendicular to the flux pattern. Therefore, the multiple coil arrangement improves coverage by the flux pattern of the area where the targeted transponder may be residing. This is accomplished due to the fact that "dead zones," i.e., areas where there is no signal or flux filed, are either substantially reduced or are eliminated. In this embodiment, the inner and outer coils are connected in series. They may be connected in parallel. When connected in parallel, more windings may be utilized in each coil, which lowers the inductance of the overall antenna and results in an increased read range and less interference from noise generated by surrounding objects. However, these changes also cost more due to an increase in materials and the labor to construct and assemble this embodiment.

In this embodiment, interrogator 10' is formed using a first outer antenna or outer winding 40 surrounding at least one additional inner antenna or inner winding 42. The inner winding 42 is preferably of a different shape as compared to the outer winding 40. Preferably, the inner winding 42 is a parallelogram, as compared to the outer winding 40, which is generally rectangular in shape. This difference in winding patterns results in two different, overlapping flux patterns between the outer winding 40, having flux pattern 40f, and inner winding 42, having flux pattern 42f, thereby resulting in better overall flux coverage of the transponder target area. These patterns or fields, are depicted in side view and top view in FIGS. 3a and 3b. As a result, a more dense inductive field is realized from interrogator 10' as compared to interrogator 10. Because of the improved coverage of the flux field, the negative effects of the variable orientation of the transponder 36 due to movement of the livestock or other factors that tend to inhibit the interrogator 10' from reading the transponder 36 are minimized.

Figure 3:
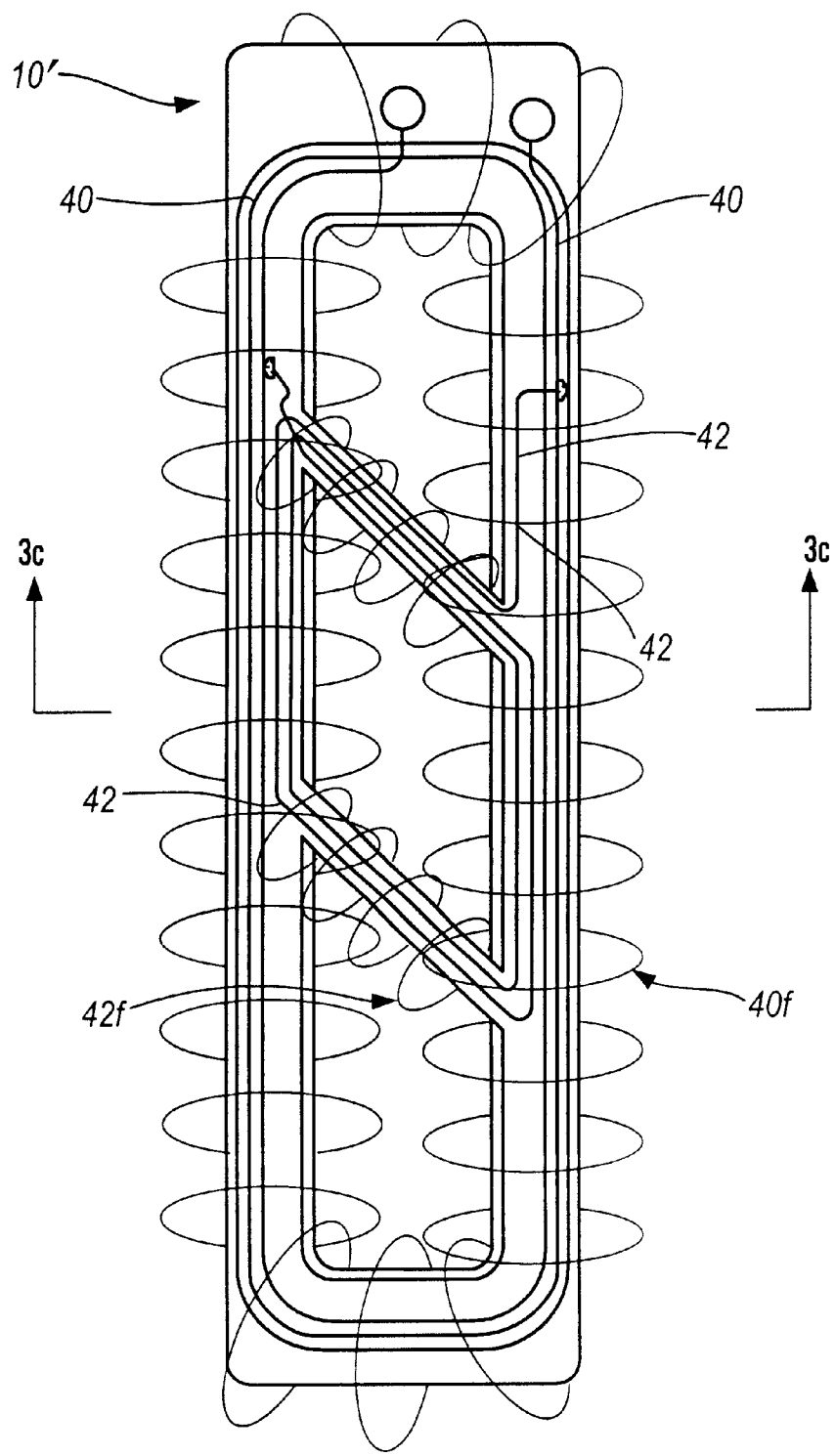
FIG. 3 is a front view of an interrogator having rectangular-shaped outer antenna and an inner antenna shaped as a parallelogram.
Figure 3A:
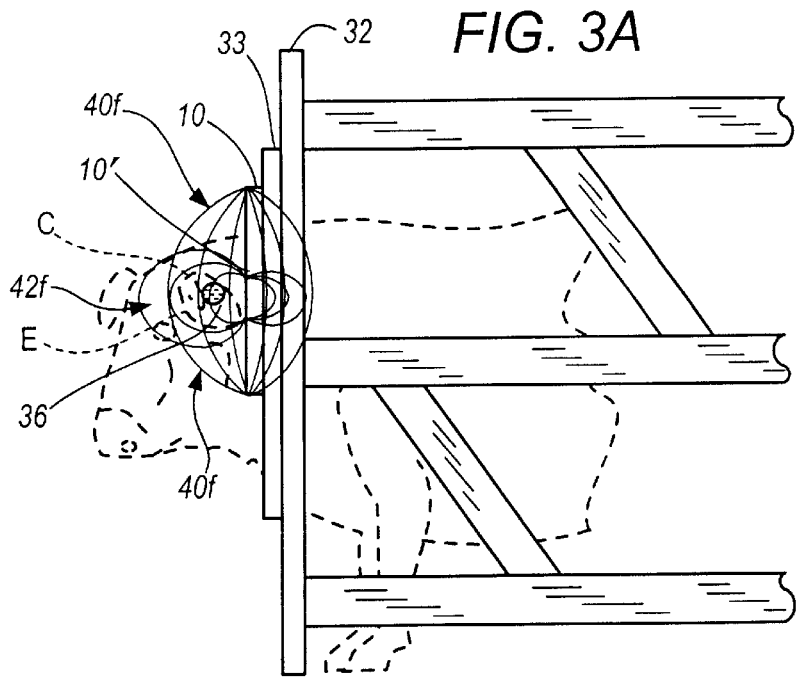
FIG. 3a is a side view of the flux pattern of the interrogator depicted in FIG. 3 when mounted on a livestock chute gate with an animal present.
Figure 3C:
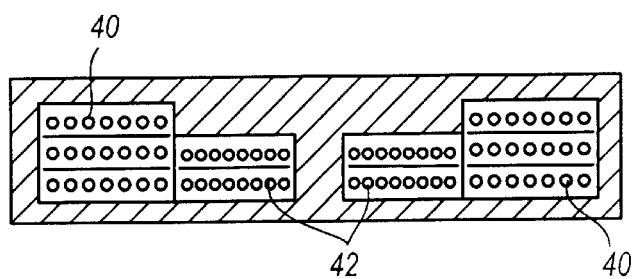
FIG. 3c is a cross-section view of the interrogator of FIG. 3 taken at line 3c—3c, depicting the layers of the inner and outer windings.
Figure 3B:
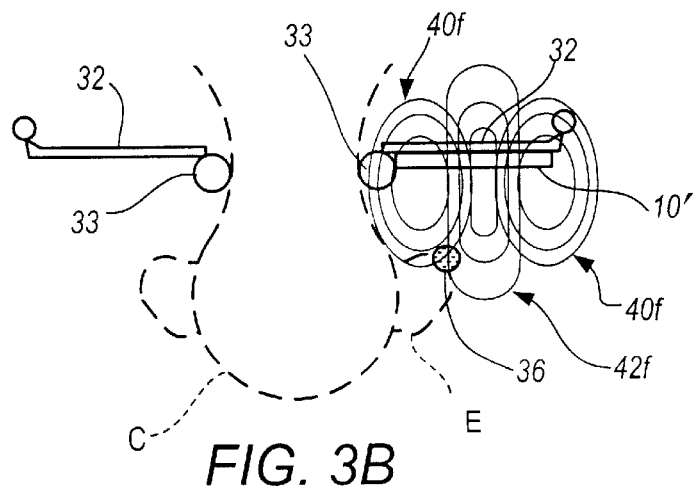

Referring now to FIG. 3c, in this embodiment, the outer winding 40 is formed using 21 turns (3 layers with 7 turns each) of 20 gauge copper wire containing 19 strands, to form a 20 gauge overall winding, yielding a winding inductance of about 489 micro-henries. The inner winding 42 is formed using 30 turns (2 layers with 15 turns each) of 24 gauge copper wire containing 19 strands, to form a 24 gauge overall winding, yielding a winding inductance of about 489 micro-henries. By electrically combining inner and outer windings 40, 42 into one interrogator 10' with a capacitor of about 6,800 pico-farads, the overall inductance of the two antennas is about 326 micro-henries.

Figure 4:
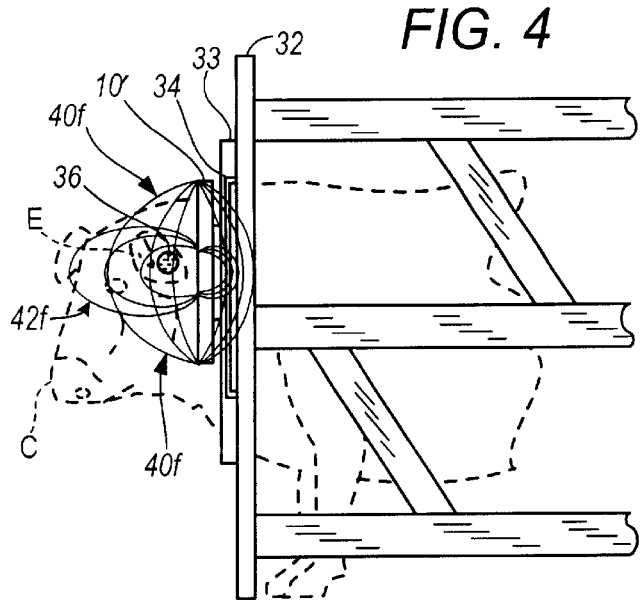
FIG. 4 is a side view of the flux pattern of the interrogator depicted in FIG. 3 with the addition of a reflector shield when mounted on a livestock chute gate with an animal present.

In yet a separate embodiment, FIG. 4 depicts a reflector shield 34 used in combination with an interrogator 10' that possesses multiple antennas in a rectangular and/or parallelogram type arrangement. As noted above, the reflector shield 34 serves to reduce interference of the flux pattern 44 of the interrogator 10' with the metal of the chute and chute gate 32, thereby improving the read range of the interrogator 10'. Accordingly, this combination provides a flux pattern that is both dense in terms of few or no dead spaces, and is also projected forward toward the target transponder 36 due to the use of a reflector shield 34. As can be seen when comparing FIGS. 3a and 4, the flux pattern 40f, generated by the outer winding 40, and the flux pattern 42f, generated by the inner winding 42, are both projected forward or toward the livestock's ear when a reflector shield is used.

Figure 5B:
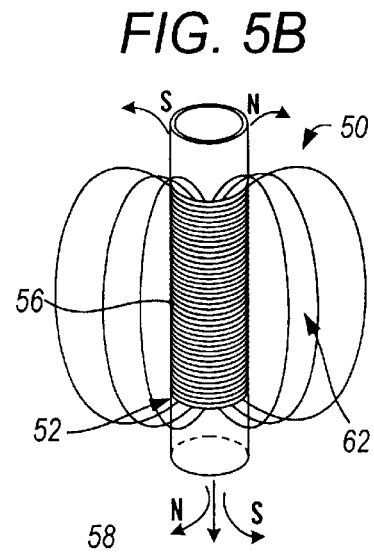
FIG. 5b is view of the flux pattern generated by the interrogator of FIG. 5, uninfluenced by the presence of either a livestock chute gate or an animal.
Figure 5:
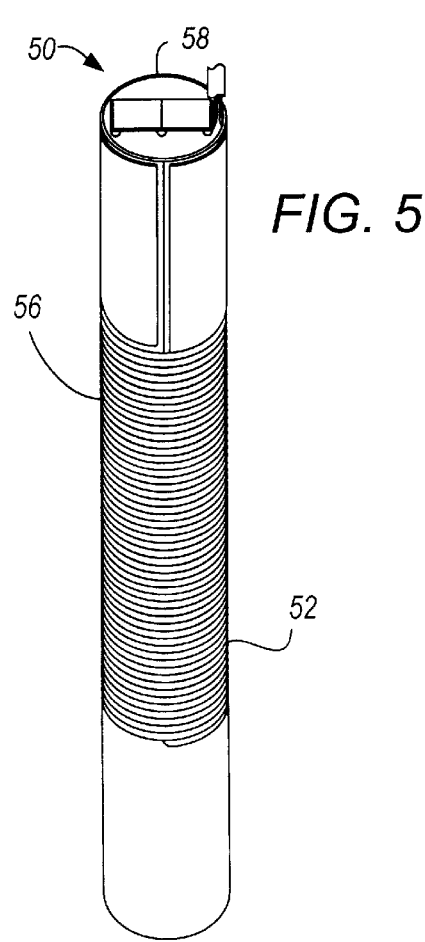
FIG. 5 is a perspective view of an interrogator having a single cylindrical-shaped antenna.
Figure 5A:
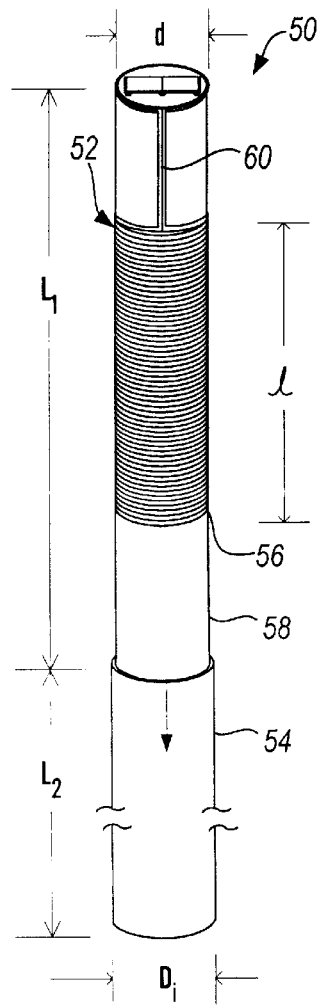
FIG. 5a is a further exploded perspective view of the antenna of FIG. 5 positioned for insertion in an outer housing.

Referring now to FIGS. 5 and 5a, interrogator 50, a cylindrical-shaped interrogator device, is presented. In this further embodiment, an antenna 52 is placed in a hollow tube 54 for attachment to livestock chute gate 32. This embodiment utilizes a cylindrical winding 56 of wire around an inner core 58, which is then placed inside a protective hollow tube 54. Various sizes of polyvinyl chloride (PVC) solid rod or hollow pipe are appropriate for the inner core 58 of this embodiment, with larger sizes of solid rod or hollow pipe offering the advantage of a larger flux field once equipped with a cylindrical winding 56. However, smaller diameter solid rods or hollow piping to construct inner core 58 offer the advantage of being able to be placed on or adjacent to a livestock chute gate 32 with less chance of physically impeding a worker that may be in the area of the interrogator 50. Therefore, for safety reasons, smaller diameter and shorter lengths of materials used to form interrogator 50 offer preferable safety advantages over larger diameter and longer lengths of materials because the interrogator 50 is structurally less obtrusive.

Preferably, the interrogator 50 is formed using materials that can be placed on or proximate a livestock chute gate 32. More preferably, the inner core 58 of the interrogator 50 of the present embodiment is constructed using a length of solid rod or hollow piping between 12 to 60 inches in length. More preferably yet, the inner core is about 28.5 inches in length "$L_1$". Preferably, the solid rod or hollow pipe is between 1 to 10 inches in diameter "d", more preferably, between 1 to 6 inches in diameter, still more preferably, between about 1.5 and 2 inches in diameter, and yet still more preferably about 1.875 inches in diameter. Preferably, the inner core 58 of the interrogator 50 is constructed of a solid PVC rod. However, a hollow cylindrical member or pipe/tube may also be used to form the inner core 58. If a hollow pipe is used to form the inner core 58, it is preferably made of a non-ferromagnetic material, and more preferably is formed of a plastic material, and more preferably yet is made of schedule 80 PVC piping. However, if hollow piping is used as an inner core 58, it is preferably back-filled with a filler or potting material to offer some measure of structural support for the hollow piping walls for strength and durability in the event that the piping should receive an impact from the livestock. Such material also does not alter the flux field generated by the antenna. After the inner core 58 is fitted with the cylindrical winding 56 to form antenna 52, the inner core 58 is then positioned in a hollow tube 54 of non-ferromagnetic material. More preferably, hollow tube 54 is comprised of schedule 80 PVC that is about 30 inches long "$L_2$" with about a 2 inch inside diameter "$D_i$," and about a 2.25 inch outside diameter.

Referring still to FIGS. 5 and 5a, in a preferred embodiment, the inner core 58 is a solid rod-like section of PVC or similar material that, although not required, may be milled or recessed along its exterior to allow for the circular winding 56 of the antenna 52 to align flush with the remainder of the outer surface of the inner core 58. Therefore, by recessing the inner core 58 of solid PVC rod in the region to receive the cylindrical winding 56 of wire, the inner core 58 is then able to be slipped inside a larger diameter protective hollow tube 54 with a flush and relatively solid finished condition along the entire length of the antenna 52, that possesses little or no void spaces between the outer surface of the inner core 58 and the inner surface of the hollow tube 54.

Lead wires 60 extend away from cylindrical winding 56 to a power source and other circuitry and a computer (not shown). Optionally, grooves or a recessed area may also be milled into inner core 58 such that lead wires 60 can also be installed with a flush fit along the length of the inner core 58.

Figure 5G:
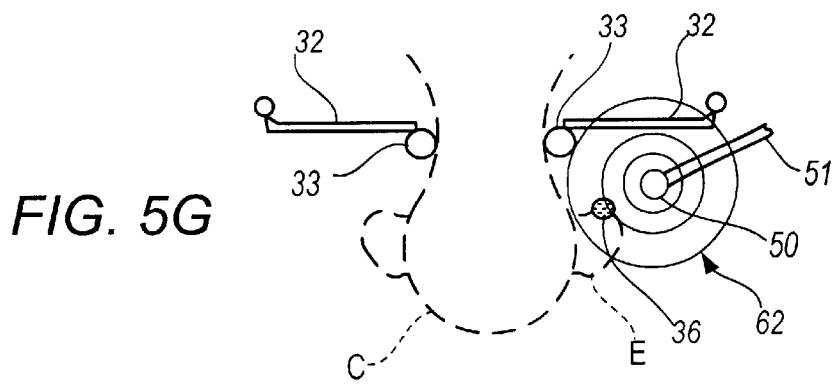
FIG. 5g is the top view of the flux pattern of the interrogator of FIG. 5 when mounted on a separate structure proximate a livestock chute gate with an animal present.
Figure 9:
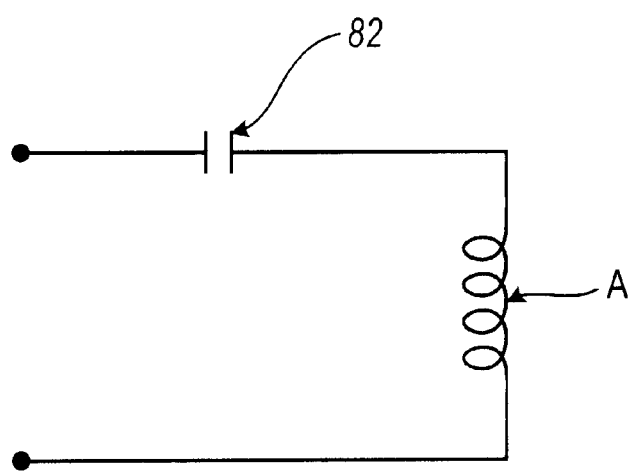
FIG. 9 is a schematic of circuit used in the cylindrical-shaped interrogators.

Preferably, the antenna 52 is formed by 295 turns of 19 strands of 32 gauge copper wire, to form a 20 gauge overall winding that covers about a 19 inch length "l" of the inner core 58. Accordingly, the milled or recessed region of inner core 58 is also approximately equal to length "l". Using a single capacitor, the antenna 52 is operated at about 6,800 picofarads capacitance, yielding about 350 micro-henries of inductance. FIG. 9 is a schematic of the typical circuit used in the cylindrical-shaped interrogators. Multiple capacitors may be used if operated at cumulative capacitance of about 6,800 pico-farads. FIG. 5b depicts the uninfluenced flux pattern 62 of the antenna of FIGS. 5 and 5a. More particularly, FIG. 5b depicts the flux pattern that is generated when not influenced by the presence of a chute gate or an animal. FIG. 5c depicts a side view and FIG. 5d depicts a top view of the flux pattern 62 of cylindrical-shaped interrogator 50 mounted on a metal livestock chute gate 32 with cow "C" present. Interrogator 50 may also be mounted on the roll-bar 33 of chute gate 32, as depicted in FIGS. 5e and 5f. Alternately, interrogator 50 may be mounted to a separate structure 51, as depicted in FIG. 5g. In either case, the flux field generated by this embodiment is sufficient to read a transponder affixed to the head of livestock.

Figure 5H:
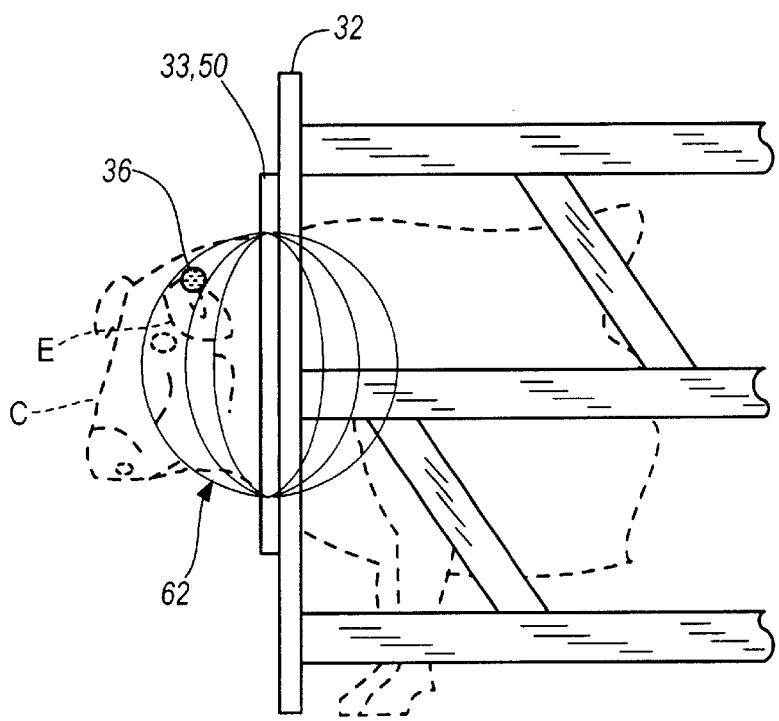
FIG. 5h is the side view of the flux pattern of the interrogator of FIG. 5 when mounted within both roll-bars of a livestock chute gate with an animal present.
Figure 5I:
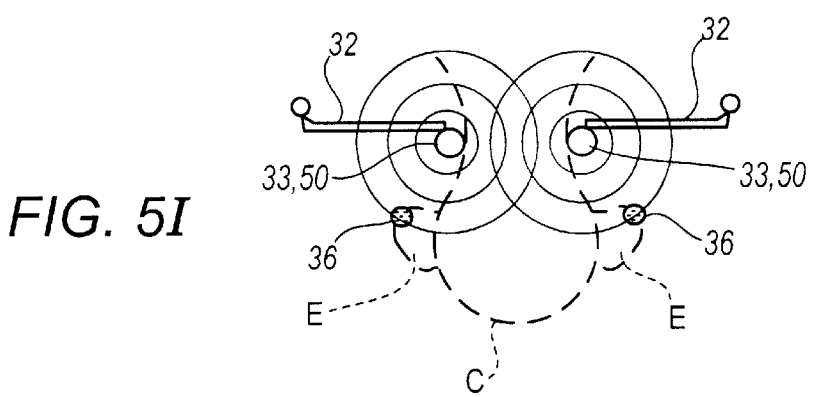
FIG. 5i is a top view of the flux pattern depicted in FIG. 5h.

In yet a separate embodiment, as depicted in FIGS. 5h and 5i, interrogator 50 of FIGS. 5 and 5a may be constructed within one or both roll-bars 33 of chute gate 32. FIG. 5i depicts an interrogator 50 within each roll bar 33. However, it is to be understood that, if desired, an interrogator 50 could be limited to only one roll bar 33. Clearly placement of an interrogator 50 on both sides of a chute gate 32 allows interrogation of livestock that may have transponders 36 placed on either ear "E" of the animal.

In yet a further embodiment, a reflector shield 64 is used in combination with the cylindrical-shaped interrogator 50. As previously discussed, the reflector shield 64 is positioned between the interrogator 50 and the livestock chute gate 32. Here, the reflector shield's shape can be modified to optimize the reflective feature, if desired. For example, a simple rectangular-shaped reflector shield could be used. Alternately, a different shaped reflector can be used, such as a dish-shaped or half-tube-shaped reflector shield that more closely matches the shape of the actual antenna being utilized. FIG. 6 illustrates a cross-section of cylindrical-shaped interrogator 50 used in conjunction with an arcuate-shaped reflector shield 64, both of which are mounted proximate a livestock chute gate 32. FIG. 6a provides a top view of the interrogator 50 and reflector shield 64 depicted in FIG. 6. FIG. 6b depicts a side view and FIG. 6c depicts a top view of the flux pattern 62 of generated by cylindrical-shaped interrogator 50 mounted on a metal livestock chute gate 32 with cow "C" present. The presence of reflector shield 64 projects the flux field 62 forward toward the transponder 36 affixed to cow "C," and thereby reduces the amount of interrogation signal that is absorbed by chute gate 32.

Figures 7, 7A:
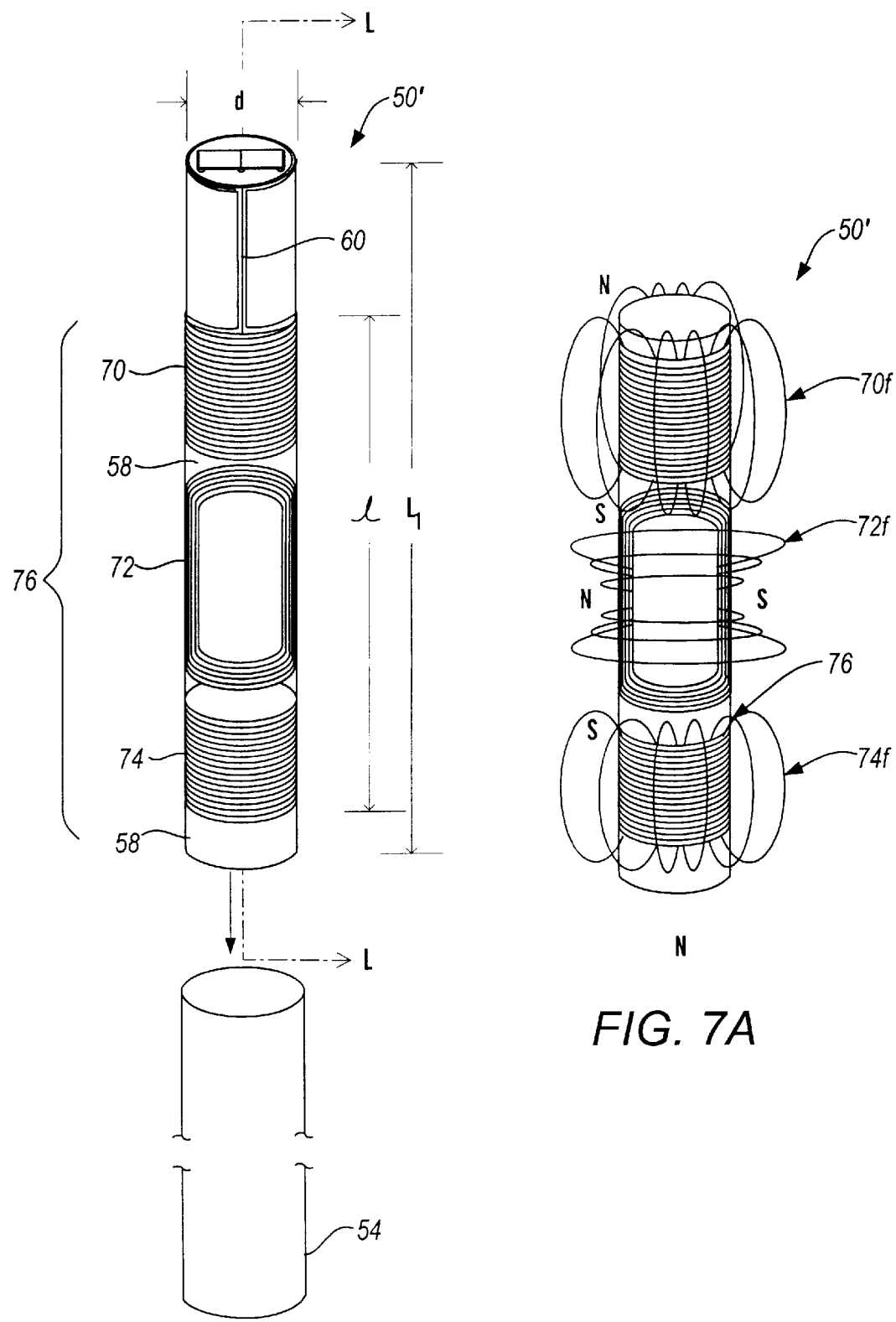
FIG. 7 is an exploded perspective view of an antenna assembly, having cylindrical-shaped multiple-antennas, positioned for insertion in an outer housing.
FIG. 7a is the flux pattern generated by the interrogator of FIG. 7, uninfluenced by the presence of either a livestock chute gate or an animal.

In still a further embodiment, multiple antennas or windings are used as part of a single cylindrical-shaped interrogator. Preferably, at least two antennas or coils are used in a single interrogator. More preferably yet, as illustrated in FIG. 7 three separate antennas or coils 70, 72, 74 are used to create one overall antenna assembly 76, thereby forming a cylindrical-shaped multiple-coil interrogator 50'. The three coils 70, 72, 74 having individual flux patterns 70f, 72f, and 74f, respectively, are used to create an overall or hybrid flux pattern with increased coverage in the anticipated location or likely read area of the target transponder, thereby reducing the existence of "dead space," and the associated problem of failing to read a transponder. As shown in FIG. 7, three separate windings or antennas 70, 72, 74 are placed along the length of one cylinder. Preferably, two cylindrical windings 70, 74 are used, with one cylindrical winding 70 and 74 placed at each end of an inner core 58. The cylindrical windings 70, 74 are two separate windings that circle the circumference of inner core 58 at either end of the inner core 58. Between the cylindrical windings 70, 74 is situated a third longitudinal winding 72. The longitudinal winding is oriented such that its long axis is parallel to the longitudinal axis L-L of inner core 58. The coils may be connected in series or parallel depending upon the size and power requirements of the interrogator.

Overall, the three antennas 70, 72, 74 of this preferred embodiment span about 19 inches of the length of the inner core 58. In a preferred embodiment, cylindrical windings 70, 74 span about 5.25 inches of the length of inner core 58. Preferably, these antennas are each comprised of 70 turns of 19 strands of 32 gauge wire each, such that each cylindrical winding 70 and 74 is about 20 gauge overall. A third winding, longitudinal winding 72, is positioned near the center of the inner core 58, and is preferably formed using 13 turns of 19 strands of 32 gauge wire each, to form a 20 gauge overall winding. Longitudinal winding 72 has a central area that is about 7 inches long and about 1.5 inches wide. Overall, the three windings cover a span of about 19 inches in length along the longitudinal axis of inner core 58. At least one capacitor is also preferably used together with the wire windings of antennas 70, 72, 74, and is operated to generate about 6,600 pico-farads capacitance. The effect of the three antennas 70, 72, 74 is to create one overall antenna 76 that functions with an inductive range of preferably between 100 to 600 micro-henries, more preferably, between 200 and 500 micro-henries and still more preferably, between 300 and 400 micro-henries, and still more preferably yet, about 350 micro-henries. The actual amount of windings, voltage and capacitance utilized is variable, with intent of generating the inductive results and previously indicated.

The inner core 58 of interrogator 50' is preferably a non-ferromagnetic material, such as a plastic material, and more preferably, a solid cylindrical-shaped section of PVC. The inner core 58 preferably is solid PVC milled or recessed to accommodate in a flush manner the addition of the wire windings 70, 72, 74. Preferably, the inner core 58 of the interrogator 50' of the present embodiment is constructed using a length of rod or piping between 12 to 60 inches in length. More preferably, the interrogator 50' is about 28.5 inches in length "$L_1$". Preferably, the inner core 58 is between 1 to 10 inches in diameter "d", more preferably, between 1 to 6 inches in diameter, still more preferably, between about 1.5 and 2 inches in diameter, and yet still more preferably about 1.875 inches in diameter. As with the embodiment shown in FIG. 6, the present embodiment of FIG. 7 is preferably slipped into an outer protective hollow tube 54 made of non-ferromagnetic material. More preferably, the hollow tube 54 is comprised of schedule 80 PVC that is about 30 inches long with a 2 inch inside diameter and a 2.25 inch outside diameter.

FIG. 9 illustrates a simple electric circuit schematic that can be used with all of the embodiments of FIGS. 5–7, e.g., the cylindrical antennas. The circuit comprises the particular antenna A in series with a capacitor 82. The capacitor can range between 4,000 and 12,000 pico-farads.

Although the present embodiment is shown to include windings around a cylindrical-shaped inner core 58, it is to be understood that other shapes for the inner core 58 are contemplated as well. Specifically, the inner core 58 may have a cross-section that is rectangular-shaped, elliptical-shaped, oval-shaped, or the inner core may be an elongated multiple-sided structure, such as an elongated pentagon, hexagon, heptagon, octagon, etc. Furthermore, the inner core may be shaped to combine multiple shapes. For example, the inner core may possess a cylindrical shape at one end, an elliptical shape in its middle, and a rectangular shape at its other end. By altering the shape of the inner core 58, the windings are modified, thereby altering the flux pattern generated by the windings.

Figure 7B:
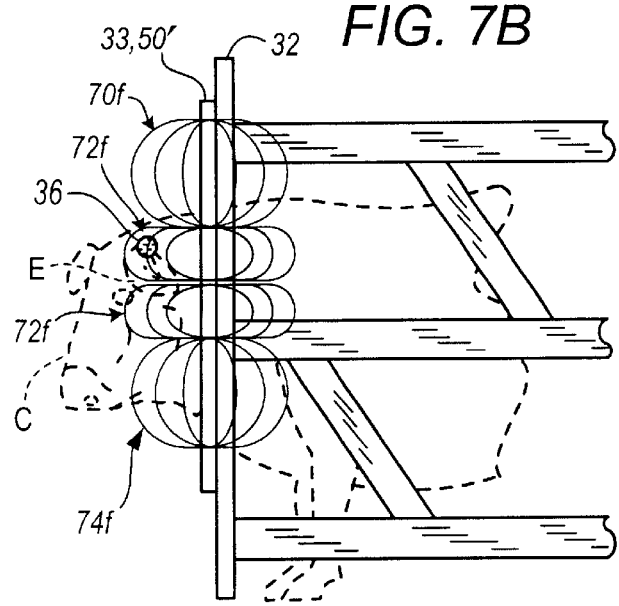
FIG. 7b is the side view of the flux pattern of the interrogator of FIG. 7 when mounted within one of the roll-bars of a livestock chute gate, and with an animal present.
Figure 7C:
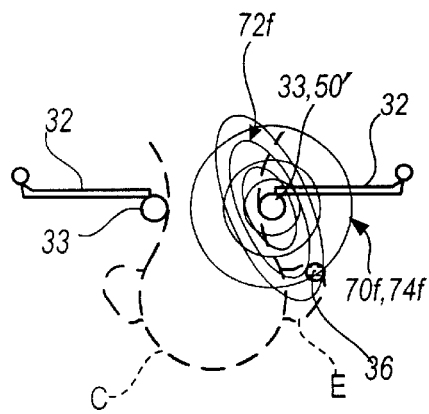
FIG. 7c is a top view of the flux pattern depicted in FIG. 7b.
Figure 7D:
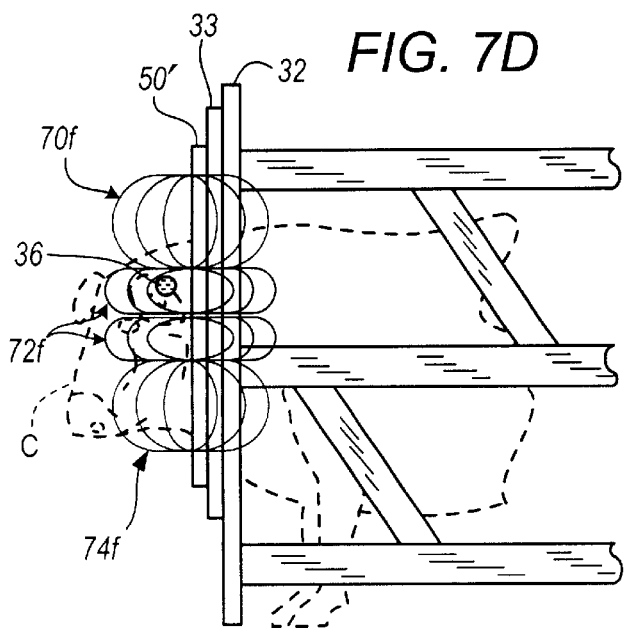
FIG. 7d is the side view of the flux pattern of the interrogator of FIG. 7 when interconnected to a roll-bar of a livestock chute gate, and with an animal present.
Figure 7E:
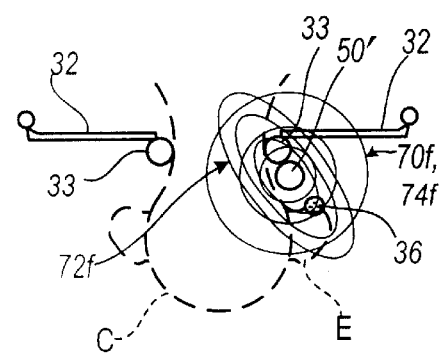
FIG. 7e is a top view of the flux pattern depicted in FIG. 7d.

FIG. 7a depicts the uninfluenced flux pattern components 70f, 72f, and 74f of the antenna of FIG. 7. More particularly, FIG. 7a depicts the flux pattern that is generated when not influenced by the presence of a chute gate or an animal. The flux patterns 70f, 72f, and 74f clearly show that the central region of the tube contains an inductive influence that is different than that present in FIG. 5b. FIG. 7b depicts a side view and FIG. 7c depicts a top view of the flux pattern components 70f, 72f, and 74f of the cylindrical-shaped multiple-coil interrogator 50' mounted within a roll-bar of a livestock chute gate 32 with cow "C" present. However, interrogator 50' may be placed in a tube separate from that of roll bar 33, such as the configuration presented in FIGS. 7c and 7d. In addition, interrogator 50' may be placed in one or both sides of chute gate 32. This embodiment may also be coupled with a reflector shield to further enhance the projection of the flux pattern toward the direction of a transponder. As noted above, the reflector shield may be of any shape, but preferably, the reflector shield possesses a concave shape in the direction of the transponder.

Any of the above-described interrogators may be installed or retrofitted to an existing chute gate. In addition, any of the above-described interrogators may be constructed in conjunction with the manufacture or installation of a new chute gate. For example, cylindrical-shaped interrogators described herein may be formed as an integral part of a roll-bar that is interconnected to the chute gate.

In summation, one aspect of the present invention is to provide an interrogator that may be mounted proximate a livestock chute gate, for reading a transponder. A separate embodiment is presented that comprises a reflector shield that is used in combination with an interrogator to optimize the flux field and improve the ability to read transponders. Another aspect of the present invention is to provide a plurality of windings or antennas on one interrogator that function after assembly as one antenna that provides a hybrid flux pattern that is relatively dense with very little or no "dead space." Such a flux pattern provides a read zone that allows transponders to be read when presented in varied orientations due to the size of the animal to which the ear tag transponder is attached and the orientation of the animal's ear, as well as accommodating for the presence of moisture or other detuning influences that may be present in the vicinity of the interrogator. If further allows the antenna to be mounted proximate the livestock chute to allow automated interrogation and simultaneously enhance worker safety.

While the above description and the drawings disclose and illustrate numerous alternative embodiments, one should understand, of course, that the invention is not limited to these embodiments. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. An interrogator device for use with a plurality of identification transponders, said interrogator device producing an interrogation signal for interrogating at least one of the plurality of transponders, the transponders transmitting an identification signal in response to said interrogation signal, each of the plurality of transponders being adapted to attach to an article to be identified, said identification signal including at least an identification component, said interrogator device comprising:

a transmitter, said transmitter including a first transmit coil, a second transmit coil, and a third transmit coil wherein said first transmit coil, said second transmit coil and said third transmit coil do not overlap, said first transmit coil, said second transmit coil and said third transmit coil coupled to one another.

2. The interrogator device as claimed in claim 1, wherein said interrogation signal comprises an inductance of about 250 to 450 micro-henries.

3. The interrogator device as claimed in claim 1, wherein said interrogation signal comprises an inductance of about 350 micro-henries.

4. The interrogator device as claimed in claim 1, wherein said first transmit coil, said second transmit coil and said third transmit coil are connected in series.

5. The interrogator device as claimed in claim 1, wherein said first transmit coil, said second transmit coil and said third transmit coil are connected in parallel.

6. The interrogator device as claimed in claim 1, wherein said first transmit coil, said second transmit coil and said third transmit coil are wire wound around a cylindrical-shaped body.

7. The interrogator device as claimed in claim 1, wherein said interrogator device is placed proximate a livestock chute.

8. The interrogator device as claimed in claim 1, wherein said interrogator device is placed proximate a livestock chute gate.

9. The interrogator device as claimed in claim 1, wherein said interrogator device is used in combination with a reflector shield.

10. The interrogator device as claimed in claim 1, wherein said first transmit coil produces a first flux field, said second transmit coil produces a second flux field, said third transmit coil produces a third flux field, and at least one of said first flux field or said second flux field is oriented differently than said third flux field.

11. The interrogator device as claimed in claim 10, wherein at least one of said first flux field or said second flux field intersects the plurality of transponders at a different angle than said third flux field.

12. The interrogator device as claimed in claim 10, wherein at least one of said first flux field or said second flux field is a different pattern than said third flux field.

13. The interrogator device as claimed in claim 10, wherein at least one of said first flux field, said second flux field, or said third flux field has a substantially spherical pattern and another of said flux fields has a substantially elliptical pattern.

14. The interrogator device as claimed in claim 10, wherein a total overall flux field generated by said first flux field, said second flux field, and said third flux field is denser than a flux field generated by both said first flux field and said second flux field.

15. The interrogator device as claimed in claim 1, wherein the windings of said first and third transmit coils are parallel.

16. The interrogator device as claimed in claim 1, wherein said first transmit coil is wound in a first direction, said second transmit coil is wound in a second direction different from the first direction and a third transmit coil is wound in substantially the same direction as the first direction.

17. The interrogator device as claimed in claim 1, wherein the second transmit coil is located between the first and third transmit coils.

18. An interrogator device for use with a plurality of identification transponders, said interrogator device producing an interrogation signal for interrogating at least one of the plurality of transponders, the transponders transmitting an identification signal in response to said interrogation signal, each of the plurality of transponders being adapted to attach to an article to be identified, said identification signal including at least an identification component, said interrogator device comprising:

a transmitter including a first transmit coil encompassed by a second transmit coil, said first transmit coil and said second transmit coil electrically coupled to one another, said first transmit coil generating a first flux field, said second transmit coil generating a second flux field, wherein said first flux field circumscribes said second flux field, and wherein said first transmit coil comprises a parallelogram shape that is not rectangular, and wherein said second transmit coil comprises a rectangular shape.

19. The interrogator device as claimed in claim 18, wherein a reflector shield is situated proximate said interrogator device.

20. The interrogator device as claimed in claim 18, wherein said first transmit coil or said second transmit coil comprises a copper coil.

21. The interrogator device as claimed in claim 20, wherein said copper coil is made of a 16 to 18 gauge copper wire.

22. The interrogator device as claimed in claim 18, wherein either of said first transmit coil or said second transmit coil comprises between 10–20 turns of wire.

23. The interrogator device as claimed in claim 18, wherein said interrogator device is placed proximate a livestock chute.

24. The interrogator device as claimed in claim 18, wherein said interrogator device is placed proximate a livestock chute gate.

25. The interrogator device as claimed in claim 18, wherein said first flux field is oriented differently than said second flux field.

26. The interrogator device as claimed in claim 18, wherein said first flux field intersects the plurality of transponders at a different angle than said second flux field.

27. The interrogator device as claimed in claim 18, wherein said first flux field has a different pattern than said second flux field.

28. The interrogator device as claimed in claim 18, wherein a flux field generated by said first flux field and said second flux field is denser than a flux field generated by either said first flux field or said second flux field.

29. An interrogator device for use with a plurality of identification transponders, said interrogator device producing an interrogation signal for interrogating at least one of the plurality of transponders, the transponders transmitting an identification signal in response to said interrogation signal, each of the plurality of transponders being adapted to attach to an article to be identified, said identification signal including at least an identification component, said interrogator device comprising:

an inner core having a longitudinal axis;

a transmitter, said transmitter including a first transmit coil wound around said longitudinal axis, a second transmit coil wound around said longitudinal axis, and a third transmit coil generally positioned parallel to said longitudinal axis, said first transmit coil, said second transmit coil and said third transmit coil coupled to one another.

30. The interrogator device as claimed in claim 29, wherein said interrogation signal comprises an inductance of about 250 to 450 micro-henries.

31. The interrogator device as claimed in claim 29, wherein said interrogation signal comprises an inductance of about 350 micro-henries.

32. The interrogator device as claimed in claim 29, wherein said first transmit coil, said second transmit coil and said third transmit coil are connected in series.

33. The interrogator device as claimed in claim 29, wherein said first transmit coil, said second transmit coil and said third transmit coil are connected in parallel.

34. The interrogator device as claimed in claim 29, wherein said inner core is substantially a cylindrical-shaped body.

35. The interrogator device as claimed in claim 29, wherein said interrogator device is placed proximate a livestock chute.

36. The interrogator device as claimed in claim 29, wherein said interrogator device is placed proximate a livestock chute gate.

37. The interrogator device as claimed in claim 29, wherein said interrogator device is used in combination with a reflector shield.

38. The interrogator device as claimed in claim 29, wherein said inner core is comprised of a non-ferromagnetic material.

39. The interrogator device as claimed in claim 29, wherein said inner core is comprised of a plastic material.

40. The interrogator device as claimed in claim 29, wherein said first transmit coil produces a first flux field, said second transmit coil produces a second flux field, said third transmit coil produces a third flux field, said third flux field oriented differently than either said first flux field or said second flux field.

41. The interrogator device as claimed in claim 40, wherein said first flux field and said second flux field intersect the plurality of transponders at a different angle than said third flux field.

42. The interrogator device as claimed in claim 40, wherein said first flux field and said second flux field have different patterns than said third flux field.

43. The interrogator device as claimed in claim 40, wherein said first flux field and said second flux field have a substantially spherical pattern.

44. The interrogator device as claimed in claim 40, wherein a flux field generated by said first flux field, said second flux field, and said third flux field is denser than a flux field generated by only said first flux field and said second flux field.

45. An interrogator device for use with a plurality of identification transponders, said interrogator device producing an interrogation signal for interrogating at least one of the plurality of transponders, the transponders transmitting an identification signal in response to said interrogation signal, each of the plurality of transponders being adapted to attach to an article to be identified, said identification signal including at least an identification component, said interrogator device comprising:

a transmitter, said transmitter including a transmit coil;

a reflector shield situated proximate said interrogator device.

46. The interrogator device as claimed in claim 45, wherein said reflector shield comprises aluminum.

47. The interrogator device as claimed in claim 45, wherein said transmit coil comprises a copper coil.

48. The interrogator device as claimed in claim 47, wherein said copper coil is made of a 16 to 18 gauge copper wire.

49. The interrogator device as claimed in claim 45, wherein said interrogator device is placed proximate a livestock chute.

50. The interrogator device as claimed in claim 45, wherein said interrogator device is placed proximate a livestock chute gate.

51. In combination:

an interrogator device for use with a plurality of identification transponders, said interrogator device including a transmitter having a first transmit coil wound in a first direction, a second transmit coil spaced apart from said first transmit coil along a longitudinal axis and wound in a direction parallel to said first direction, and a third transmit coil disposed between said first and second transmit coils and wound in a direction generally perpendicular to said first and said second transmit coils, said first transmit coil, said second transmit coil and said third transmit coil electrically coupled to one another;

an existing mechanical gate fitted with said interrogator device.

52. The combination as claimed in claim 51, further comprising a processor for processing an identification signal.

53. The combination as claimed in claim 51, further comprising a receiver.

54. The combination as claimed in claim 51, further comprising a cylindrical-shaped inner core.

55. The combination as claimed in claim 51, further comprising a reflector shield.

56. The combination as claimed in claim 51, wherein at least one of said first transmit coil, said second transmit coil, or said third transmit coil is made of a 16 to 18 gauge copper wire.

57. A system for identifying characteristics of animals in a livestock chute, the system comprising:
   a transponder mounted to an animal to be identified;
   an interrogator comprising an antenna assembly for transmitting an interrogation signal to said transponder, and for receiving an identification signal from said transponder, the antenna including a first transmit coil encompassed by a second transmit coil, wherein said first transmit coil comprises a parallelogram shape that is not rectangular, wherein said second transmit coil comprises a rectangular shape;
   a reflector shield situated proximate said interrogator, said reflector shield projecting a portion of said interrogation signal toward said transponder.

58. The system, as claimed in claim 57, wherein said interrogation signal has an inductance between about 250–450 micro-henries.

59. The system, as claimed in claim 57, wherein said reflector shield comprises aluminum.

60. The system, as claimed in claim 57, wherein said reflector shield is at least 1 square foot in area.

61. The system, as claimed in claim 57, wherein said antenna assembly comprises a copper coil.

62. The system, as claimed in claim 61, wherein said copper coil comprises 16 to 18 gauge copper wire.

63. The system, as claimed in claim 62, wherein said copper coil comprises between 10–20 turns of said 16 to 18 gauge copper wire.

64. The system, as claimed in claim 57, wherein said reflector shield is about 2 inches away from said interrogator.

65. The system, as claimed in claim 57, wherein said interrogator is mounted on a livestock chute gate.

66. The system, as claimed in claim 57, wherein said transponder comprises information identifying the animal.

67. A method of identifying an animal, said method comprising:
   (a) providing a livestock chute having a livestock chute gate capable of temporarily confining the animal;
   (b) attaching a transponder to the animal;
   (c) attaching an interrogator proximate the livestock chute gate, the interrogator having a transmitter including a first transmit coil wound in a first direction, a second transmit coil spaced apart from said first transmit coil along a longitudinal axis and wound in a direction parallel to said first direction, and a third transmit coil disposed between said first and second coils and wound in a direction generally perpendicular to said first direction and the direction of said second transmit coil, said first transmit coil, said second transmit coil and said third transmit coil electrically coupled to one another; the interrogator further having a receiver;
   (d) providing a power source to the interrogator;
   (e) transferring an animal to the livestock chute gate;
   (f) generating an interrogation signal by activating the interrogator;
   (g) receiving an identification signal from the transponder;
   (h) processing the identification signal; and
   (i) creating an output signal substantially corresponding to the identification component of the identification signal.

68. The method as claimed in claim 67, wherein said attaching step of step (c) comprises attaching the interrogator to a previously existing livestock chute gate.

69. The method as claimed in claim 67, wherein said attaching step of step (c) comprises attaching the interrogator to new livestock chute gate.

70. The method as claimed in claim 67, further comprising the step of transmitting the output signal to a separate location following step (i).

71. The method as claimed in claim 67, further comprising the step of positioning a reflector shield proximate the interrogator before step (f).

72. The method as claimed in claim 67, further comprising the step repeating steps (e) through (i).

73. The method as claimed in claim 67, wherein said step of generating an interrogation signal comprises generating multiple flux fields.

74. The method as claimed in claim 67, wherein said step of generating an interrogation signal comprises generating different flux patterns.

75. The method as claimed in claim 67, wherein said step of generating an interrogation signal comprises generating multiple flux fields having different orientations.

76. An interrogator device for use in combination with a livestock chute, and for use with an identification transponder attached to an animal, said interrogator device producing an interrogation signal for interrogating the transponder, the transponder transmitting an identification signal in response to said interrogation signal, said identification signal including at least an identification component, said interrogator device comprising:
   a transmitter, said transmitter including a first transmit coil for generating the interrogation signal, wherein said first transmit coil is wound around a cylindrical-shaped inner core in a first direction, and further comprising a second transmit coil wound in a second direction different than said first direction and substantially parallel to a longitudinal axis of the inner core, and a third transmit coil wound around the cylindrical-shaped inner core in substantially the same direction as said first transmit coil, wherein said second transmit coil is located between said first transmit coil and said third transmit coil, and wherein said first transmit coil, said second transmit coil and said third transmit coil are electrically coupled to one another;
   a reflector shield located between said transmitter and said livestock chute, wherein said reflector shield reflects a portion of the interrogation signal away from the livestock chute and toward the transponder.

77. The interrogator device as claimed in claim 76, wherein said first transmit coil is encompassed by a second transmit coil, wherein said first transmit coil comprises a parallelogram shape that is not rectangular, wherein said second transmit coil comprises a rectangular shape, and wherein said first flux field circumscribes said second flux field.

78. The interrogator device as claimed in claim 76, wherein said reflector shield is rectangular shaped.

79. The interrogator device as claimed in claim 76, wherein said reflector shield is curved.

80. An interrogator device for use with a plurality of identification transponders, said interrogator device producing an interrogation signal for interrogating at least one of the plurality of transponders, the transponders transmitting an identification signal in response to said interrogation signal, each of the plurality of transponders being adapted to attach to an article to be identified, said identification signal including at least an identification component, said interrogator device comprising:

a transmitter, said transmitter including a first transmit coil wound in a first direction, a second transmit coil wound in a second direction different than said first direction, and a third transmit coil wound in substantially the same direction as said first direction, and said first transmit coil, said second transmit coil and said third transmit coil electrically coupled to one another.

81. The interrogator device as claimed in claim 80, wherein said first transmit coil, said second transmit coil and said third transmit coil do not overlap.

82. The interrogator device as claimed in claim 80, wherein wherein said second transmit coil is located between said first transmit coil and said third transmit coil.

* * * * *